(12) United States Patent
Lewis et al.

(10) Patent No.: US 7,681,286 B1
(45) Date of Patent: Mar. 23, 2010

(54) DEVICE FOR STORING A CARGO STRAP

(75) Inventors: John Robert Lewis, Indian Mound, TN (US); Jeanne Beth Lewis, Indian Mound, TN (US)

(73) Assignee: Kinedyne Corporation, Branchburg, NJ (US)

( * ) Notice: Subject to any disclaimer, the term of this patent is extended or adjusted under 35 U.S.C. 154(b) by 742 days.

(21) Appl. No.: 11/483,293

(22) Filed: Jul. 7, 2006

Related U.S. Application Data

(60) Provisional application No. 60/698,265, filed on Jul. 11, 2005.

(51) Int. Cl.
*B60P 7/06* (2006.01)
*B60P 7/08* (2006.01)
*B25B 25/00* (2006.01)

(52) U.S. Cl. .................. 24/68 CD; 24/68 R; 254/213; 254/218

(58) Field of Classification Search ............... 24/16 R, 24/68 R–70 R, 298, 302; 206/388, 442, 349, 206/702; 224/318; 254/51, 150, 184, 186, 254/352, 359, 213, 218; 410/12, 96, 97, 410/100, 103, 104, 106, 110; 383/6, 19, 383/72, 74–76, 78, 84, 121, 125; 441/80, 441/84, 85
See application file for complete search history.

(56) References Cited

U.S. PATENT DOCUMENTS

| | | | |
|---|---|---|---|
| 4,185,360 A | 1/1980 | Prete, Jr. et al. | |
| 5,426,826 A | 6/1995 | Takimoto | |
| 5,439,109 A | 8/1995 | McBride | |
| 5,855,045 A | 1/1999 | Miura | |
| 6,038,745 A | 3/2000 | Rapp | |
| 6,547,218 B2 | 4/2003 | Landy | |
| 6,604,618 B1 * | 8/2003 | Godshaw et al. ............ 206/320 |
| 6,789,671 B2 | 9/2004 | Morrison | |
| 6,880,702 B1 * | 4/2005 | Colorado ................ 206/388 |
| 7,165,294 B2 * | 1/2007 | Surdam ................ 24/68 CD |

* cited by examiner

*Primary Examiner*—Robert J Sandy
(74) *Attorney, Agent, or Firm*—Young Basile

(57) ABSTRACT

A machine for storing a strap with a bag attached to the fixed strap of a ratchet-buckle assembly.

7 Claims, 4 Drawing Sheets

DEVICE FOR STORING A CARGO STRAP

CROSS REFERENCE TO RELATED APPLICATIONS

This application claims benefit of Provisional Patent Application No. 60/698,265 filed Jul. 11, 2005.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

The instant disclosure relates generally to tie down straps. More specifically, the disclosure is of a strap protection and storage device comprising a bag attached to a strap in combination with a ratchet-buckle having a handle lockable in a position substantially in contact with the strap.

The need to secure objects to various platforms either for storage or transport has long been realized. At present, a well known solution is to employ a strap and ratchet-buckle assembly comprising a ratchet-buckle having two ends, anterior and posterior, and first and second straps having first and second ends. The first end of the ratchet-buckle comprises a means to permanently attach the first end of a short first strap, and the second end of the ratchet-buckle comprises a strap winding shaft upon which the first end of the second strap may be wound by means of a ratcheting mechanism that communicates with the strap winding shaft. The second ends of the straps comprise means, usually hooks of some sort, to secure them to opposite sides of a platform.

As disclosed by U.S. Pat. No. 5,855,045 by Miura; U.S. Pat. No. 4,185,360 by Prete, Jr. et al.; U.S. Pat. No. 5,426,826 by Takimoto; and U.S. Pat. No. 6,547,218 by Landy, such ratchet-buckle devices for the purpose of tightening straps in order to secure objects on a platform are well known.

To employ such a device, the second end of one strap is secured to one side of a load platform, usually by means of a hook. The second end of the other strap is likewise attached to the opposite side of the platform and this strap is looped over the load to be secured, and inserted through a slot that transverses a strap winding shaft. Then, slack is taken up by pulling this strap as far as possible through the slot. The strap is then further tensioned by winding it on the winding shaft by means of the ratcheting mechanism.

While the ratchet-buckle assembly is a useful and effective object securing device, it is not without drawbacks. Since practicality makes it desirable that one strap ratchet and buckle assembly be suitable for all cargo sizes and shapes, the straps must be of great length to accommodate large objects. Thus, when it is used to secure a smaller object, a long length of strap will be left flapping in the breeze beyond the strap winding shaft unless otherwise secured. This creates a hazard of particular note if it is exposed to high speed wind such as will occur on a flat bed semi-trailer or a railroad flat car. It can flap wildly causing damage to the strap itself or the secured cargo, or to passing vehicles.

The problem is generally solved, as by Miura, by winding the excess section of the second strap onto the strap winding shaft. However, there are numerous occurrences wherein the length of the second end of said second strap will not be entirely wound upon the strap winding shaft.

Furthermore, when the strap ratchet and buckle assembly is not in use, its straps tend to become entangled. The present disclosure is of a strap protection and containment device to secure and protect the otherwise loose strap ends during the use of a ratchet-buckle assembly and to store the entire strap ratchet and buckle assembly when not in use.

U.S. Pat. No. 6,789,671 B2 by Morrison, et al, teaches two sheaths connected by a tether. The first sheath is generally flat and has two open ends. The second sheath is also flat and has two open ends, but is elongated and is connected to a storage bag. Both sheaths are dimensioned to allow standard sized binding strap to be to be easily threaded therethrough so that the sheaths function as a guide for the strap, and to which a storage bag must be affixed. These sheaths add significant expense and complexity to the manufacturing process. In substantial contrast, the present disclosure teaches the storage bag as an organic component of the system and requires no guide sheaths at all, greatly simplifying manufacture and is thus an improvement over Morrison et al.

Furthermore, Morrison, et al teaches no means of closure for the storage bag other than a drawstring which when employed will leave drawstring ends to wildly flap during transit causing damage to both the drawstring and the storage bag. In further contrast, the present innovation teaches a storage bag comprising an elastic closure and/or other means not involving a drawstring, affecting further improvement over Morrison, et al.

U.S. Pat. No. 6,038,745 by Rapp teaches means to secure unused portions of a strap by means of a buckle and/or eyes through which said portions may be passed to form loops. In contrast to Rapp, the instant art teaches a storage bag rather than buckles and/or eyes. In further contrast to the instant, art, Rapp teaches no combination with a mechanical device to facilitate application of tension between secured ends of a strap or straps. Thus, the Rapp art is not suitable for applications taught by the instant art.

U.S. Pat. No. 5,439,109 by McBride teaches a portable container which facilitates storage and retrieval of flexible, elongated elements. The container comprises a base and a conically tapered body portion that terminates in a closeable aperture. In contrast to the instant art, McBride teaches no bag closure means independent of the bag and teaches no permanent attachment to the elements being stored.

BRIEF SUMMARY OF THE INVENTION

The primary object of the invention is to increase the safety of a ratchet-buckle assembly for securing a load to a platform by providing a strap protection and storage device to contain the free end of a tie-down strap when the device is in use thus preventing the free end of a tie-down strap from flapping around during travel.

Another object of the invention is to increase the efficiency of securing a load on a platform by means of a ratchet-buckle assembly.

Yet another object of the present disclosure is to provide a convenient and self-contained device for storing an entire ratchet-buckle assembly when said ratchet-buckle assembly is not in use.

A further object of the invention is to provide a device that is most easily manufactured with greatest economy of labor and material.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for storing a strap comprising: a bag attached to the fixed strap of a ratchet-buckle assembly.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

LIST OF COMPONENTS

Figure 1:
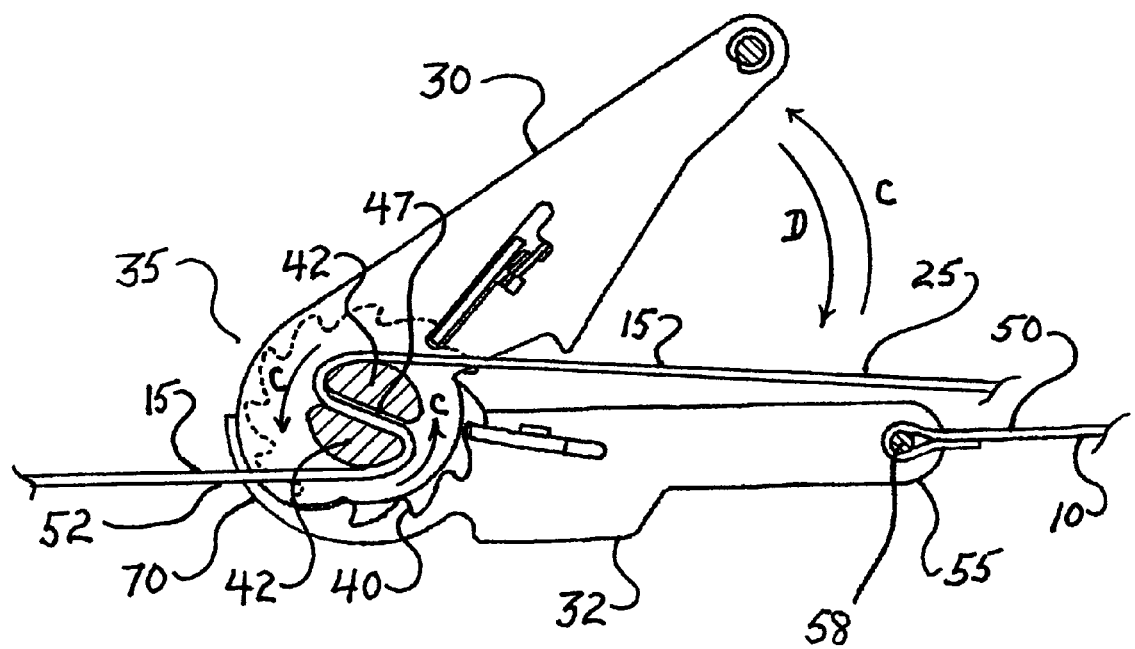
FIG. 1 is a side perspective view of a ratchet-buckle.

10 First strap
15 Second strap
20 Bag
22 Bag opening
25 Second strap free section
28 Bag anterior end
30 Ratchet handle
32 Ratchet-buckle body
35 Ratchet-buckle
37 Strap attachment means
40 Ratchet
42 Shaft
47 Shaft slot
50 First strap first end
52 Second strap first end
55 Ratchet-buckle posterior end
58 Transverse element
70 Ratchet-buckle anterior end
72 First strap second end
75 Second strap second end
82 Cargo
84 Load platform
86 Second strap attachment point
88 First strap attachment point
90 Buckle and strap assembly
92 Strap unit
94 Handle end
96 Ratchet-buckle clamp surface
98 Pleats

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Looking now at FIG. 1, we see a ratchet-buckle (35) of any type well known in the art, U.S. Pat. No. 5,426,826 by Takimoto or U.S. Pat. No. 4,185,310 by Prete, Jr. et al. for example, comprising a ratcheting handle (30) and a body (32) which supports a ratchet wheel assembly (40) and a shaft (42). The shaft (42) is rotatably supported transverse the ratchet-buckle body (32) at an anterior end (70) of the body (32) and communicates with the ratchet wheel assembly (40) so that the shaft (42) may be rotated by the ratcheting handle (30). To the ratchet-buckle body posterior end (55) is attached the second end (72) of a first strap (10) by means of a transverse element (58), usually a shaft, supported by the body (32). A first strap first end (50) is folded back upon itself and attached to itself thusly comprising a loop around the transverse element (58).

Looking further at FIG. 1, we see that the shaft (42) comprises a slot (47) through which a first end (52) of the second strap (15) may be inserted.

Now, those versed in the art may appreciate that as the ratchet handle (30) is moved in Direction C, it engages the ratchet wheel assembly (40) thusly rotating the shaft (42) in direction C and winding a portion of the first end (52) of the second strap (15) upon the shaft (42). When the ratchet handle (30) has moved the maximum extent in Direction C, the ratchet handle (30) disengages from the ratchet wheel assembly (30) and the ratchet wheel assembly (40) is then locked whereupon the ratchet handle (30) may be moved in Direction D. When the ratchet handle (30) is thus moved in Direction D the maximum extent, the ratchet handle re-engages the ratchet wheel assembly (40) and the ratchet wheel assembly is unlocked so that the ratchet handle (30) may again be moved in Direction C. Thusly, a portion of the second strap first end (52) may be wound upon the shaft (42).

Also, we may readily appreciate that after the desired length of second strap (15) first end (52) is wound upon the shaft (42), there is generally remaining a free section (25) of the second strap (15) first end (52) extending from the anterior body end (70) past the posterior body end (55).

Figure 2:
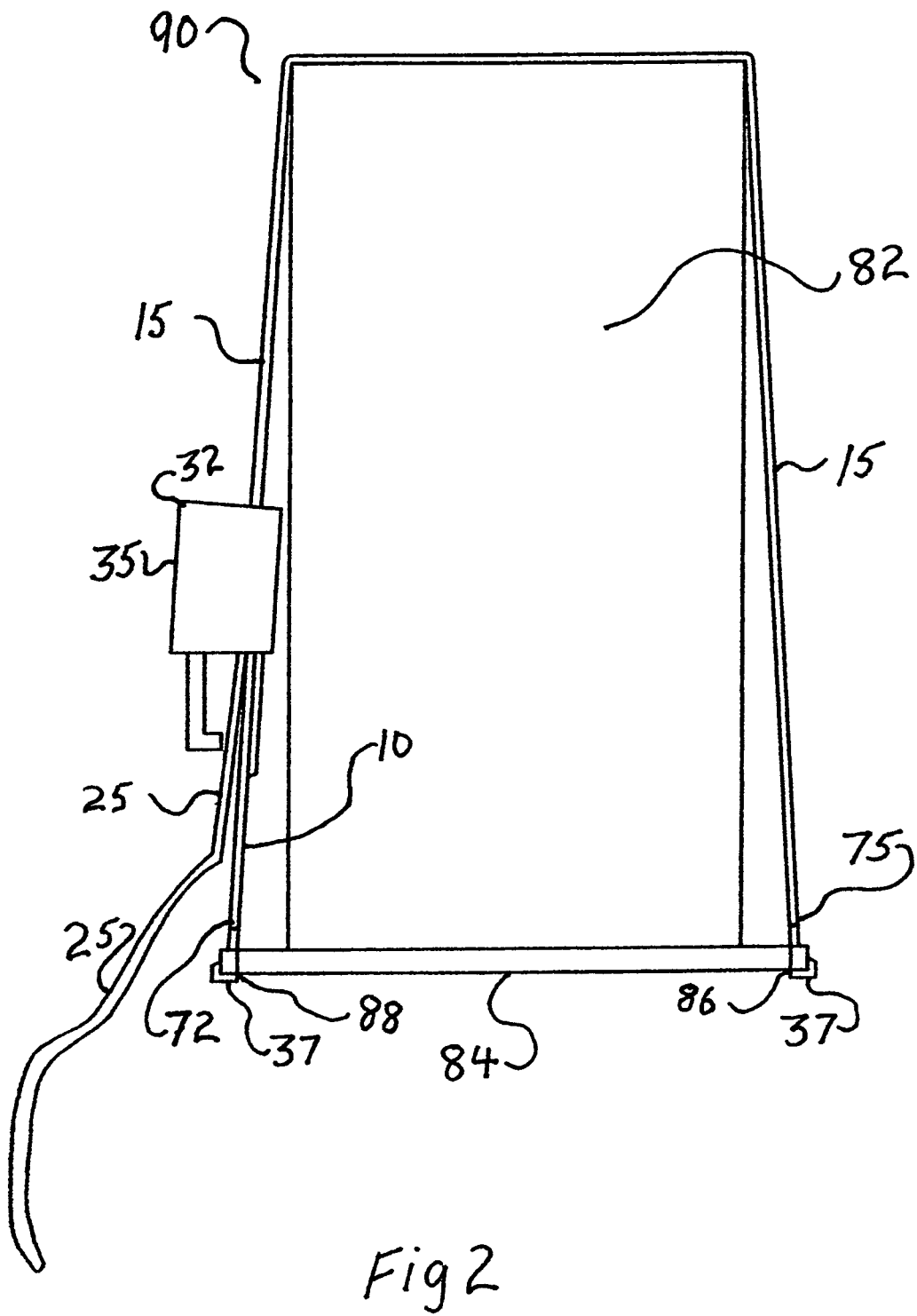
FIG. 2 is a rear perspective view of an object with the instant art in use.

Looking now at FIG. 2, we see that the first strap (10), the second strap (15), and the ratchet-buckle (35) comprise a buckle-strap assembly (90).

Looking further at FIG. 2, we see that the second ends (72 and 75) of the straps (10 and 15) comprise means (37), usually hooks of some sort, to attach said second ends (72 and 75) to a load platform (84).

Looking still further at FIG. 2, we see that the second ends (72 and 75) of the first strap (10) and second strap (15) are attached to opposite sides of the load platform (84) supporting a cargo (82). Also, we see that the second strap (15) extends from a point of attachment (86) to the load platform (84) over the top of the cargo (82) to a point on the opposite side of the cargo (82) where it communicates with the ratchet-buckle (35). In addition, we see that the first strap second end (72) is attached to the load platform (84) at an attachment point (88) and that the first strap first end (50) is attached to the ratchet-buckle body (32). Thus, we see the cargo (82) secured to a platform (84) by means of a buckle-strap assembly (90).

Now, looking again at FIG. 1 and again at FIG. 2, those skilled in the art will readily appreciate that in order to secure the cargo (82) to the structure (84), the second strap first end (52) is inserted through the shaft slot (47) manually to the point that maximum tension is created in the buckle and strap assembly (90) whereupon a second strap free section (25) will extend beyond the shaft slot (47) towards the body posterior end (55).

Then, by means of the ratchet wheel assembly (40) and ratchet handle (30), the second strap free end (25) and a portion of the second strap (15) between the ratchet-buckle (35) and the second strap point of attachment (86) are wound upon the shaft (42) thusly adding more tension to the buckle strap assembly (90) between the points of attachment (86 and 88) by means of mechanical assistance of the ratchet-buckle (35). Also, we understand that the ratchet handle (30) and the ratchet (40) are locked in a position so that the tension is maintained.

Turning attention yet again to FIG. 2, we may readily appreciate that the disposition of structural components of the ratchet-buckle (35) and their dimensions will dictate the length of the second strap (15) that may be wound about the shaft (42) or that the maximum tension might be reached before all the free section of the second strap (25) is wound about the shaft (42). Thus, occasions will arise when free sections of the second strap (25) must be secured in some manner, especially if the cargo (82) secured is to be transported, by a flatbed semi-trailer or flatbed railroad car for example, such that the second strap free end (25) will be exposed to high speed air impact, thus creating the need for the instant art.

Figure 3:
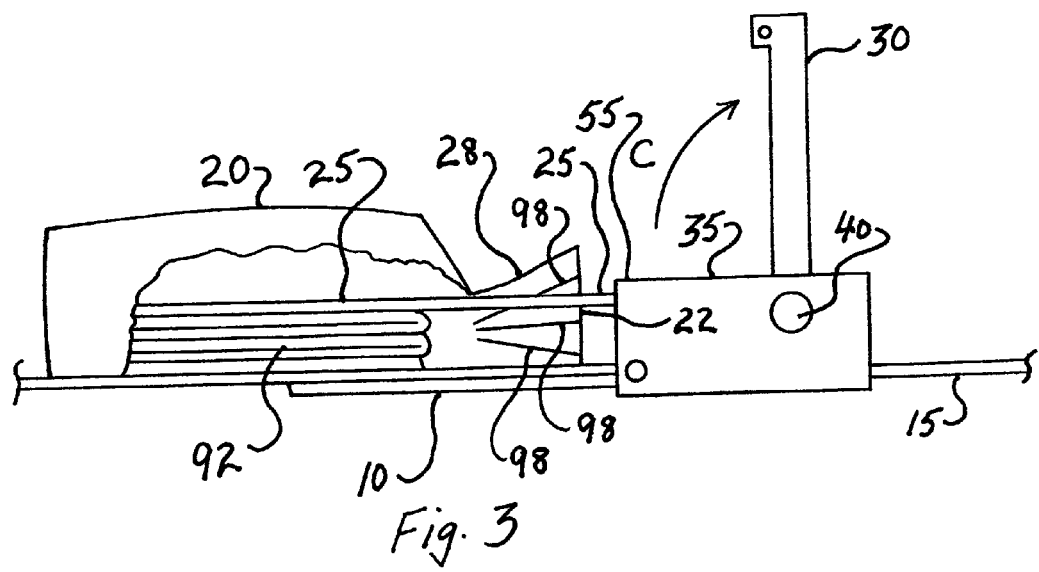
FIG. 3 is a side perspective view of the invention with a portion of the storage bag cut away.

Turning now to FIG. 3, we see a buckle strap assembly (90) under tension, second strap second end (75) and first strap second end (72) not shown, with the second strap free end (25) extending beyond the ratchet-buckle posterior end (55). Further, we note that the ratchet handle (30) has been moved the maximum distance in Direction C, at which point the ratchet wheel assembly (40) is locked to maintain tension, while the ratchet handle (30) may be rotated back in Direction D and locked, all according to previously described processes.

Also, we see a bag (20), shown with section cut away, affixed by any of sundry means well known in the art, to the first strap (10) near the first strap first end (50) and proximal the ratchet-buckle posterior end (55). Further, we note that the bag (20) comprises an opening (22) so that the second strap free end (25) may be inserted into the bag (20). Ideally, the second strap (15) will comprise a material of sufficient flexibility that it may be coiled or folded back upon itself to form a compact strap unit (92) to facilitate the insertion of the second strap free end (25) into the bag (20) and to most efficiently exploit the capacity of the bag (20).

Figure 4:
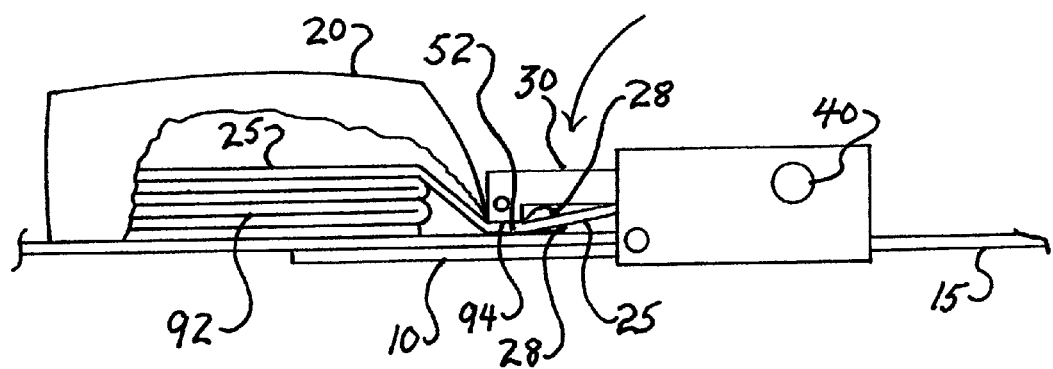
FIG. 4 is a side perspective view of the invention with a portion of the storage bag cut away.

Looking yet again at FIG. 3 and now at FIG. 4, we see that the bag (20) has an anterior end (28) that may be compactly folded or otherwise disposed so that said folded or otherwise disposed bag anterior end (28) will form a seal or closure of the bag opening (22) about the second strap first end (52) that extends through the bag opening (22) and will contact the first strap first end (50) substantially without overlapping said first end (52). Also, we see that the bag anterior end (28) may comprise pleats (98) or other contrivances to facilitate the folding or other disposition of the bag anterior end (28) so that the bag anterior end (28) comprises the aforementioned seal or closure of the bag opening (22).

Turning again to FIG. 4, we see that the ratchet handle (30), after being rotated in Direction D and locked in position, as previously described, after desired tension is achieved, is contrived so that a ratchet handle end surface (94) will contact the bag anterior end (28) and press upon it with sufficient force to hold it closed and the second strap first end (52) between the ratchet handle end surface (94) and the first strap first end (50).

Figure 5:
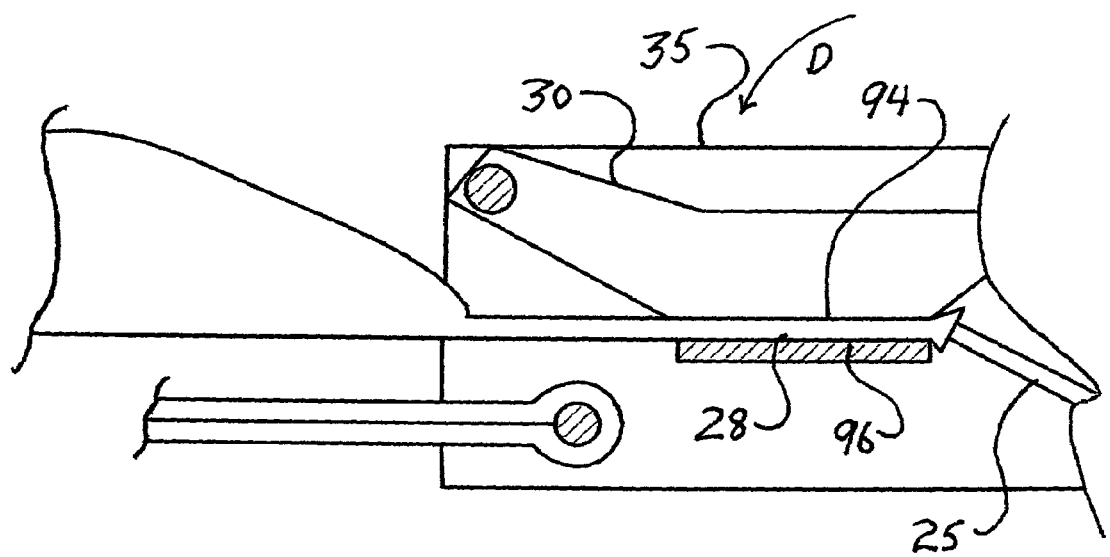
FIG. 5 is a side perspective view of a portion of the invention.

Turning now to FIG. 5, we see a portion of a ratchet-buckle (35) showing the ratchet handle (30) locked in position after being rotated in Direction D as in FIG. 4 but with the difference that the ratchet handle (30) is so configured that the ratchet handle end surface (94) will hold the bag anterior end (28), with extending second strap free end (25), closed between the ratchet handle end surface (94) and a suitable ratchet-buckle clamp surface (96) comprised by the ratchet-buckle (35).

Thusly, the second strap free end (25) is contained and constrained by the bag so that it may not move, even in high winds.

Additionally, we may understand that the bag (20) may be of sufficient capacity to contain the entirety of both the straps (10 and 15) and the ratchet-buckle (35) so that the instant art may serve as storage means for a buckle-strap assembly (90) not in use. Further, the bag may be of various materials, water pervious or impervious. It may be open mesh or water-proof canvas, for example. Also, the bag opening (22) may comprise closure means to facilitate holding the bag anterior end (28) in position while the ratchet handle (30) is being moved and locked to hold it and/or to close the bag (20) when used in strap buckle assembly (90) storage mode.

What is claimed is:

1. A device for storing a cargo strap, comprising:
   a first strap portion having a fixed end;
   a second strap portion having a free end;
   a storage bag connected to the first strap portion near the fixed end thereof, wherein the free end of the second strap portion is receivable in the storage bag; and
   a buckle assembly fixedly connected to the first strap portion and adjustably connected to the second strap portion, the buckle assembly including a first buckle portion connected to a second buckle portion, wherein movement of the first buckle portion with respect to the second buckle portion is operable to selectively close the storage bag.

2. The device stated in claim 1, wherein the first buckle portion includes a handle configured to apply tension to the second strap portion and the second buckle portion includes a body portion that is fixedly connected to the first strap portion.

3. The device stated in claim 1, wherein the first buckle portion is pivotally connected to the second buckle portion.

4. The device stated in claim 3, wherein the first buckle portion and the second buckle portion are configured such that the pivotal movement of the first buckle portion toward the second buckle portion clamps at least part of the storage bag between the first buckle portion and the second buckle portion.

5. A device for storing a cargo strap, comprising:
   a first strap portion having a fixed end;
   a second strap portion having a free end;
   a storage bag connected to the first strap portion near the fixed end thereof, the storage bag having an open end and a closure flap that is moveable between an open position, wherein an interior of the storage bag is accessible through the open end thereof and a closed position, wherein the closure flap of the storage bag substantially blocks access to the interior of the storage bag through the open end thereof and further wherein the free end of the second strap portion is receivable in the storage bag; and
   a buckle assembly having a body portion and a handle pivotally connected to the body portion, wherein the body portion is fixedly connected to the fixed end of the first strap portion and adjustably connected to the second strap portion, wherein the handle portion is moveable from a first position to a second position in order to adjust the position of the second portion of the strap with respect to the body portion of the buckle assembly, and further wherein the handle is configured to secure the closure flap of the storage bag in the closed position when the handle is in the second position.

6. A device for storing a cargo strap, comprising:
a bag mounted on a strap buckle assembly wherein the strap buckle assembly comprises one or more elements operable to selectively close the bag;
the strap buckle assembly including a strap and a first buckle portion connected to the strap; and
the one or more elements operable to selectively close the bag including a second buckle portion that is pivotally connected to the first buckle portion.

7. A device for storing a cargo strap, comprising:
a bag mounted on a strap buckle assembly wherein the strap buckle assembly comprises one or more elements operable to selectively close the bag; and
the strap buckle assembly including a first buckle portion that is pivotally connected to a second buckle portion, wherein the first buckle portion and the second buckle portion are configured such that the pivotal movement of the first buckle portion toward the second buckle portion clamps at least part of the bag between the first buckle portion and the second buckle portion.

* * * * *